Dec. 25, 1962          J. J. HESS, JR          3,070,332
AIRCRAFT AUTOMATIC FLIGHT CONTROL APPARATUS
Filed Nov. 10, 1959
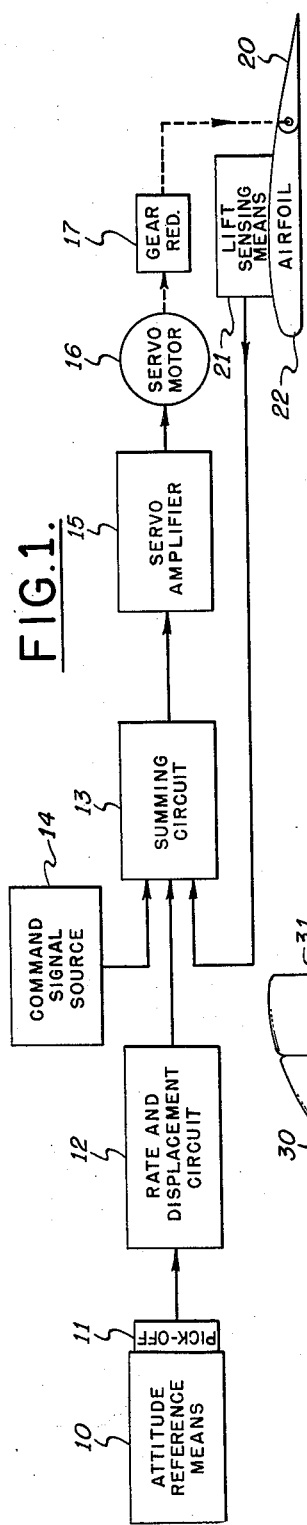
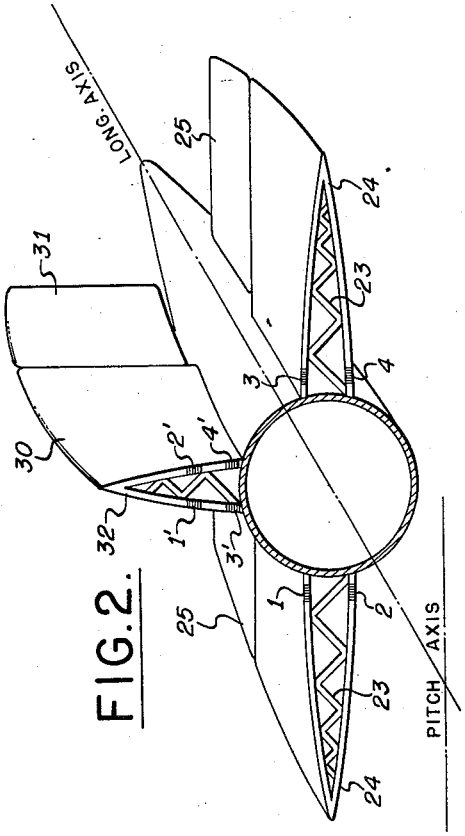
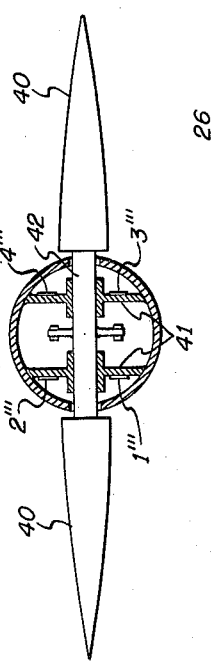
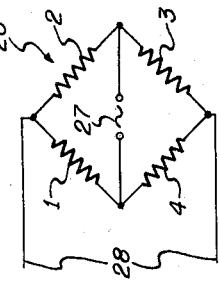
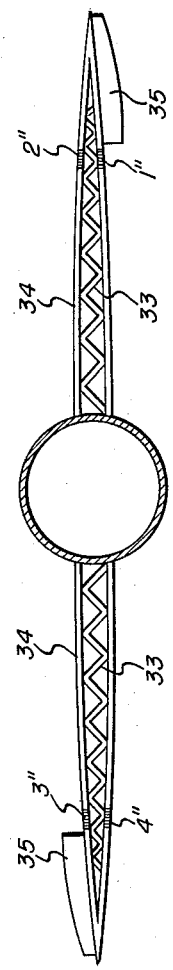
INVENTOR
JOHN J. HESS JR.
BY
ATTORNEY United States Patent Office 3,070,332
Patented Dec. 25, 1962

3,070,332
AIRCRAFT AUTOMATIC FLIGHT
CONTROL APPARATUS
John J. Hess, Jr., Garden City, N.Y., assignor to Sperry
Rand Corporation, a corporation of Delaware
Filed Nov. 10, 1959, Ser. No. 851,991
1 Claim. (Cl. 244—77)

This invention relates to automatic flight control of aircraft and particularly to aircraft flight control systems utilizing a signal representative of the aerodynamic lift produced by an air foil of the aircraft as a result of control surface movement as a feedback signal for the flight control system to automatically compensate for variations in the effectiveness of the airfoil under varying air speed and altitude conditions.

An airfoil is designed to obtain a reaction upon its surfaces from the air through which it moves. A conventional airfoil has a positionable control surface associated with it for varying the aerodynamic lift produced by the airfoil, for example, a wing has an aileron associated with it for varying the lift produced by the wing.

The effectiveness of a control surface, such as the elevators, ailerons or rudder of an aircraft depends upon the speed and altitude at which the air craft is flying. The effectiveness of the control surface and airfoil is actually a function of the dynamic pressure "$q$." In modern high speed, high altitude aircraft, the effectiveness of the control surface is proportional to the dynamic pressure, and since $q$ is equal to one half the air density multiplied by the square of the aircraft air speed, it will be readily appreciated that the problem of maintaining the control surface effectiveness substantially constant becomes acute in modern aircraft. The problem arises because the response of the aircraft, i.e., the angular acceleration of the aircraft per unit control surface deflection, is proportional to the angular deflection of the control surface which is effective in producing moments about an axis divided by the moment of inertia about that axis. In general, the moment applied to the aircraft due to a control surface deflection results from a change in lift of an airfoil which in turn is due to the change in the aerodynamic flow pattern brought about by the control surface deflection. Since the distance of the effective center of the airfoil to the center of gravity of the aircraft does not change appreciably, a specific change in lift at the airfoil will cause a specific change of moment around a particular axis of the aircraft. In order to stabilize an aircraft properly over a wide speed and altitude range, it is desirable for a given control signal to produce a substantially constant moment on the aircraft.

In order to overcome this problem two approaches have been suggested. One approach has been to utilize parameter gain control means to change the control system gain of the automatic pilot as a function of air speed, altitude, dynamic pressure or some related factors in combination with a position feedback servo system, i.e., one where the servomotor causes the surface to assume a specific position independent of the aerodynamic load on the control surface. In position type servo systems, the aerodynamic conditions on the control surface are not reflected to the input of the servo system thus requiring considerable external gain control apparatus to overcome the aforementioned problem.

Another approach previously suggested provides for torque feedback from the surface actuator rather than position feedback. However, the relationship between control surface effectiveness and the hinge moment required for a specific control surface motion on high speed aircraft is uncertain because the center of pressure of the control surface varies with air speed, and therefore the hinge moment is not a reliable measure of the control surface effectiveness. Further, the resulting moment on the aircartf may be somewhat indefinite since small differences between the lift characteristics of similar airfoils and small difference in the bearing friction of the control surface support bearings will cause variations in airfoil lift and resulting aircraft moments for a given control signal. Also, torque feedback is undesirable since it limits the servo system response at high frequencies due to the inertia of the control surface.

It is a primary object of the present invention to provide an aircraft flight control system which produces a substantially constant aircraft moment for a given control signal over a wide range of dynamic pressure conditions.

It is a further object of the present invention to provide an aircraft flight control system utilizing a signal representative of the lift produced by an airfoil as a feedback signal in the flight control system.

It is an additional object of the present invention to provide an automatic flight control system having good dynamic response characteristics over a wide speed and altitude range.

The above objects are achieved by providing a signal representative of the lift produced by the airfoil as a feedback signal to the flight control servo system. In this way, the control surface will automatically be deflected by an amount that maintains the automatic pilot-aircraft loop gain constant over a wide dynamic pressure range. The system of the present invention has considerably better dynamic response than a torque feedback system and eliminates the necessity for parameter control apparatus required in position feedback systems for varying the gain. A signal representative of the lift produced by the airfoil may be obtained by means of a strain gauge device connected to measure the lift or force transmitted to the airframe due to a change in control surface deflection thereby conveniently measuring airfoil effectiveness.

The present invention thus provides an inherent automatic gain adjustment over the aircraft air speed and altitude range by compensating for variations in the airfoil effectiveness resulting from a control surface deflection.

Referring now to the drawings,

FIG. 1 is a diagram of an aircraft flight control system embodying the invention;

FIG. 2 is a front sectional view of the empennage of an aircraft showing strain gauges attached to the horizontal and vertical tail spars;

FIG. 3 is a front sectional view showing strain gauges attached to the wing spar of an aircraft;

FIG. 4 is an electrical schematic of a preferred embodiment of the lift sensing means of FIG. 1; and FIG. 5 is a front sectional view of a movable horizontal stabilizer showing strain gauges attached to the bearing support structure.

The invention will now be described by referring to FIG. 1 with respect to an automatic flight control system for a typical aircraft. An aircraft attitude reference means 10 provides a signal by means of a pick-off 11 representative of the attitude of the aircraft. The attitude reference means 10 may be, for example, a vertical gyroscope or a directional gyroscope. The signal provided by the pick-off 11 has an amplitude proportional to the deviation of the aircraft from a predetermined attitude and a phase representative of the direction of the deviation. The attitude reference signal is applied to a rate and displacement circuit 12 which provides signals representative of the deviation and rate of deviation of the aircraft from a predetermined attitude to an input terminal of a summing circuit 13. A command signal source 14 provides a control signal in accordance with a desired aircraft movement about a particular axis of the aircraft. The control signal from the source 14 has an amplitude representative of the desired aircraft movement and a phase depending upon the direction of the desired movement. The control signal from the source 14 is also applied to an input terminal of the summing circuit 13.

The summing circuit 13 is connected to a servo amplifier 15 which amplifies the combined signal from the circuit 13 before applying it to a servomotor 16. The output shaft of the servomotor 16 is connected through reduction gearing 17 or hydraulic actuating means (not shown) to a control surface 20 for controlling the movement of the aircraft about the aircraft axis associated with the control surface 20.

To provide a feedback signal in accordance with the lift produced by the airfoil associated with the control surface 20, a lift sensing means 21 is mounted on an airfoil 22 to be responsive to the lift produced by the airfoil 22 as a result of the deflection of the control surface 20. The signal provided by the lift sensing means 21 has an amplitude representative of the lift produced by the airfoil 22 and a phase depending upon the direction of the lift. The feedback signal from means 21 is connected to an input terminal of the summing circuit 13 in phase opposition with respect to the phase of the control signal from the command source 14.

Referring now to FIGS. 2, 3 and 4 the method of application of the invention will be explained with respect to a typical aircraft when the lift produced by the airfoil is sensed by means of strain gauges. While any suitable lift sensing means is within the scope of the invention, it is preferable to use for this purpose a strain gauge of the type employing a continuous solid filament of electrical conducting material bonded throughout its effective length to the surface of the strain member so that its length and electrical resistance vary in response to the strain in the strained member. Strain gauges of this type have been described by A. C. Ruge in U.S. Patent No. 2,334,843.

Referring to FIG. 2, the four strain gauges 1, 2, 3 and 4 are secured to the upper and lower portions of the horizontal tail spar 23 of the airfoil 24 in order that when the elevator control surfaces 25 are deflected in a downward direction the lift produced on the airfoil 24 causes the strain gauges 2 and 4 to be in tension while the strain gauges 1 and 3 are in compression.

As shown in FIG. 4 the four strain gauges 1, 2, 3 and 4 are preferably connected in a Wheatstone bridge circuit 26 in a manner similar to that shown in patent 2,553,546 issued May 22, 1951 to R. Brannin entitled Airplane Automatic Pilot. A diagonal of the Wheatstone bridge 26 is connected to an alternating current reference source 27 thus providing an output signal on the leads 28 connected across the other diagonal representative of the lift produced by the airfoil 24. The signal on the leads 28 is supplied, as shown in FIG. 1, to an input terminal of the summing circuit 13 in phase opposition to the control signal.

Referring again to FIG. 2, to obtain a signal representative of the magnitude and direction of the force produced by the vertical tail airfoil 30 resulting from a deflection of the rudder 31, the strain gauges 1', 2', 3' and 4' are mounted on spaced portions of the vertical tail spar 32. The strain gauges 1', 2', 3' and 4' are electrically connected in a Wheatstone bridge as shown in FIG. 4.

Referring now to FIG. 3, the strain gauges 1", 2", 3" and 4" are secured to the upper and lower portions of the main wing spar 33 and when connected in bridge fashion as shown in FIG. 4 provide a signal representative of the magnitude and direction of the lift produced by the airfoil 34 due to the deflection of the ailerons 35.

Referring to the operation of an elevator channel incorporating the invention, assuming a pitch-up command signal from the command source 14, the servomotor 16 will deflect the elevators 25 upwardly. The upward deflection of the elevators 25 produces a change in lift on the airfoil 24 which places the strain gauges 1 and 3 in tension and 2 and 4 under compression. Due to a reduction in the resistance of the strain gauges 2 and 4 and a corresponding increase in the resistance of the strain gauges 1 and 3, an output voltage having an amplitude representative of the lift produced by the airfoil 24 is supplied on the leads 28 from the output of the bridge circuit 26 to the summing circuit 13 that opposes the command signal from the source 14. When the lift feedback signal from the circuit 26 is equal in amplitude to the command signal from the source 14, the lift on the airfoil 24, and therefore the resulting moment on the aircraft, will be equal to that commanded and the servo system will be at a null with the elevators 25 deflected the proper amount and direction.

As the aircraft begins to move in response to the control surface deflection, signals representative of the pitch attitude change are generated in the pick-off 11 of the attitude reference means 10 and applied through the rate and displacement circuit 12 to the summing circuit 13 driving the servomotor 16 in a direction to cause a reduction in the amount of the control surface deflection. This results in a reduction in the lift and therefore a reduction in the moment applied to the aircraft. Because of the lift feedback signal from the circuit 26, this reduction in moment will also be proportional to the signal from the circuit 12 independent of dynamic pressure. Since the aforementioned feedback signals are representative of the moments applied to the aircraft independent of the dynamic pressure, it will be appreciated that the present invention provides inherent gain control. Further, a command signal of a predetermined amplitude will always provide a predetermined aircraft moment in spite of wide dynamic pressure changes because the center of effectiveness of the lift on the airfoil with respect to the center of gravity of the aircraft will always remain substantially constant.

By utilizing a lift sensing means in the form of strain gauges arranged in a Wheatstone bridge circuit as described, the effects of moments around an axis perpendicular to the axis of desired motion are automatically cancelled out. For example, if motion of the aircraft is desired about the pitch axis, the effect of moments around the longitudinal axis will be cancelled because the strain gauges 1 and 4 will be subject to stress of the same magnitude and direction and their resistances will be equal while the strain gauges 2 and 3 will be subject to stress of the same magnitude but of opposite direction and their resistances will also be equal. Thus, there will be no change in the output signal on leads 28.

The operation of the present invention with respect to the rudder and aileron channels is similar to that described with respect to the elevator channel and believed to be obvious to one skilled in the art in view of the foregoing disclosure.

Although the invention has been described with respect to an aircraft having conventional airfoils and control surfaces, it is equally adaptable to aircraft having various types of airfoils and control surfaces as will be appreciated by those versed in the art. For example, as shown in FIG. 5 certain aircraft have movable horizontal tail surfaces wherein the entire horizontal tail airfoil 40 is positionable. In this case, the strain gauges 1''', 2''', 3''' and 4''' may be connected to the bearing supports 41 of the torque tube 42 which connects the movable airfoils 40. In a similar manner the present invention may also be applied to canard surfaces.

While the invention has been described in its preferred embodiments, it is to be understood that the words which have been used are words of description rather than of limitation and that changes within the purview of the

What is claimed is:

In an aircraft flight control system, an airfoil mounted on an aircraft, at least a portion of said airfoil being positionable, drive means for positioning the positionable portion of said airfoil for controlling the movement of said aircraft about an axis thereof, means including attitude reference means for providing a signal in accordance with a desired aircraft attitude with respect to said axis, lift transducer means mounted on said airfoil for measuring the lift produced by said airfoil for providing a feedback signal representative of said lift, said lift transducer means including strain guage means connected to provide a signal representative of the lift produced by said airfoil, said guage means further including a plurality of strain guages connected to provide a signal representative of the lift produced by said airfoil while compensating for forces produced by moments acting around an axis perpendicular to said axis, and control means responsive to said signals for controlling said drive means in accordance with the algebraic summation thereof.

References Cited in the file of this patent
UNITED STATES PATENTS

| | | |
|---|---|---|
| 2,511,846 | Halpert | June 20, 1950 |
| 2,924,401 | Goss et al. | Feb. 9, 1960 |
| 2,949,259 | Bell | Aug. 16, 1960 |